(12) United States Patent
Cho et al.

(10) Patent No.: US 10,527,741 B2
(45) Date of Patent: Jan. 7, 2020

(54) SETUP OF SIPM BASED PET DETECTOR USING LSO BACKGROUND RADIATION

(71) Applicant: Siemens Medical Solutions USA, Inc., Malvern, PA (US)

(72) Inventors: Sanghee Cho, Knoxville, TN (US); Robert Mintzer, Knoxville, TN (US); Johannes Breuer, Nürnberg (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 151 days.

(21) Appl. No.: 15/075,334

(22) Filed: Mar. 21, 2016

(65) Prior Publication Data

US 2016/0299240 A1   Oct. 13, 2016

Related U.S. Application Data

(60) Provisional application No. 62/143,997, filed on Apr. 7, 2015.

(51) Int. Cl.
   *G01T 1/29*   (2006.01)
   *G01T 7/00*   (2006.01)

(52) U.S. Cl.
   CPC ............ *G01T 1/2985* (2013.01); *G01T 7/005* (2013.01)

(58) Field of Classification Search
   CPC ....... G01T 7/005; G01T 1/172; G01T 1/1642; G01T 1/1641
   See application file for complete search history.

(56) References Cited

U.S. PATENT DOCUMENTS

| | | | |
|---|---|---|---|
| 7,633,057 B2 | 12/2009 | Cooke et al. | |
| 8,809,793 B2 * | 8/2014 | Wagadarikar | G01T 1/1648 250/362 |
| 2006/0102845 A1 * | 5/2006 | Williams | G01T 1/2985 250/363.03 |
| 2012/0121050 A1 * | 5/2012 | De Geronimo | H03K 5/1532 375/354 |
| 2012/0228484 A1 | 9/2012 | Burr | |
| 2013/0062526 A1 * | 3/2013 | Tsuda | G01T 1/172 250/362 |
| 2013/0087710 A1 * | 4/2013 | Zhang | G01T 1/1647 250/362 |
| 2014/0217294 A1 | 8/2014 | Rothfuss et al. | |
| 2015/0285922 A1 | 10/2015 | Mintzer et al. | |
| 2015/0301201 A1 | 10/2015 | Rothfuss et al. | |

\* cited by examiner

*Primary Examiner* — Kenneth J Malkowski

(57) ABSTRACT

Systems and methods for configuring a radiation detector are provided. A first event is detected at a first scintillator crystal of a first detector unit. A second coincident event is detected at a second scintillator crystal of a second detector unit adjacent to the first detector unit. Operating parameters are calculated for the first detector unit based on the coincident events.

13 Claims, 13 Drawing Sheets

SETUP OF SIPM BASED PET DETECTOR USING LSO BACKGROUND RADIATION

RELATED APPLICATIONS

This application claims the benefit of the filing date under 35 U.S.C. § 119(e) of Provisional U.S. Patent Application Ser. No. 62/143,997, filed on Apr. 7, 2015, which is hereby incorporated by reference in its entirety.

BACKGROUND

The present embodiments relate to setup and configuration of positron emission tomography (PET) detectors. Using a ring of detectors, pairs of gamma rays generated by positrons may be detected. Any given pair of gamma rays travel about 180 degrees apart. To distinguish specific pairs, a coincidence of detected gamma rays is determined. The timing of receipt is used to pair the detected gamma rays. The position of the gamma rays detected by a ring of detectors is used to define a line of response for reconstruction of the imaged object from the gamma rays. In order to accurately identify the position and timing of the gamma rays, detectors may be setup before the first actual scan. Furthermore, the setup may be repeated on a regular basis to account for long-term drift of material and device properties. The setup may require calibration processes with multiple radiation sources to correct for non-linearity and timing performance.

BRIEF SUMMARY

Natural emissions (e.g., beta decay) may occur in scintillator material used for PET detectors. Due to emission of gamma rays by the excited daughter nucleus or due to scattering of gamma rays, the original emission may be detected not just in the detector in which the event occurred but any number of adjacent detectors. Each adjacent detector is a detector unit with different control and/or timing detection circuitry. By detecting the emission events in both the detector units in which the decays occurred as well as an adjacent detector units, one or more setup or operational parameters to be used for one or both detector units is derived.

In a first aspect, a method configuring a radiation detector is provided. The method includes detecting a first event at a first scintillator crystal of a first detector unit. A second coincident event is detected at a second scintillator crystal of a second detector unit adjacent to the first detector unit. Operating parameters are calculated for the first detector unit based on the coincident events.

In a second aspect, a composite detector is provided that includes self-calibration. The composite detector includes a plurality of detector units that include an array of scintillation elements and photo-sensors. The detector units are configured to detect radiation events. A processor is configured to identify coincident events from the detector unit data and calculate operating parameters for the detector units.

In a third aspect, a method for configuration of a radiation detector is provided. The method includes selecting initial operating parameters for a plurality of detector units. Self-activity data is acquired from the plurality of detector units. Coincident events are identified in adjacent detector units. Timing offsets for one or more scintillator crystals in the detector units are calculated.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION

An automatic setup using background radiation is provided for a SiPM (silicon photomultiplier) based PET detector. The automatic setup may also be used in single photon emission computed tomography (SPECT), other diagnostic systems, other imaging systems, or other imaging techniques. Furthermore, at least parts of the method can be used for PET detectors that use different photo sensors than SiPMs.

Multiple discrepancies such as energy drift, positional errors, or timing issues, may occur both at an initial use and during operation of the PET detector. Setup for a PET detector may include collecting data from radiation events and adjusting parameters until the PET detector gives accurate information for image processing. Using, for example, a phantom cylinder, a PET detector may collect data over a period of time which may then be processed to correct for any errors. Using an extrinsic object is both time consuming and also impractical for use during an actual scan. Other methods such as detecting intrinsic radiation from across a PET detector have been used. These methods, however, are slow due to limited data.

Setup of a PET detector may be accomplished by only using intrinsic radiation and data from adjacent detector units. The decay of material in the detector units may be identified and processed to allow for an accurate and efficient setup of the detector units and the PET detector as a whole.

Figure 1:
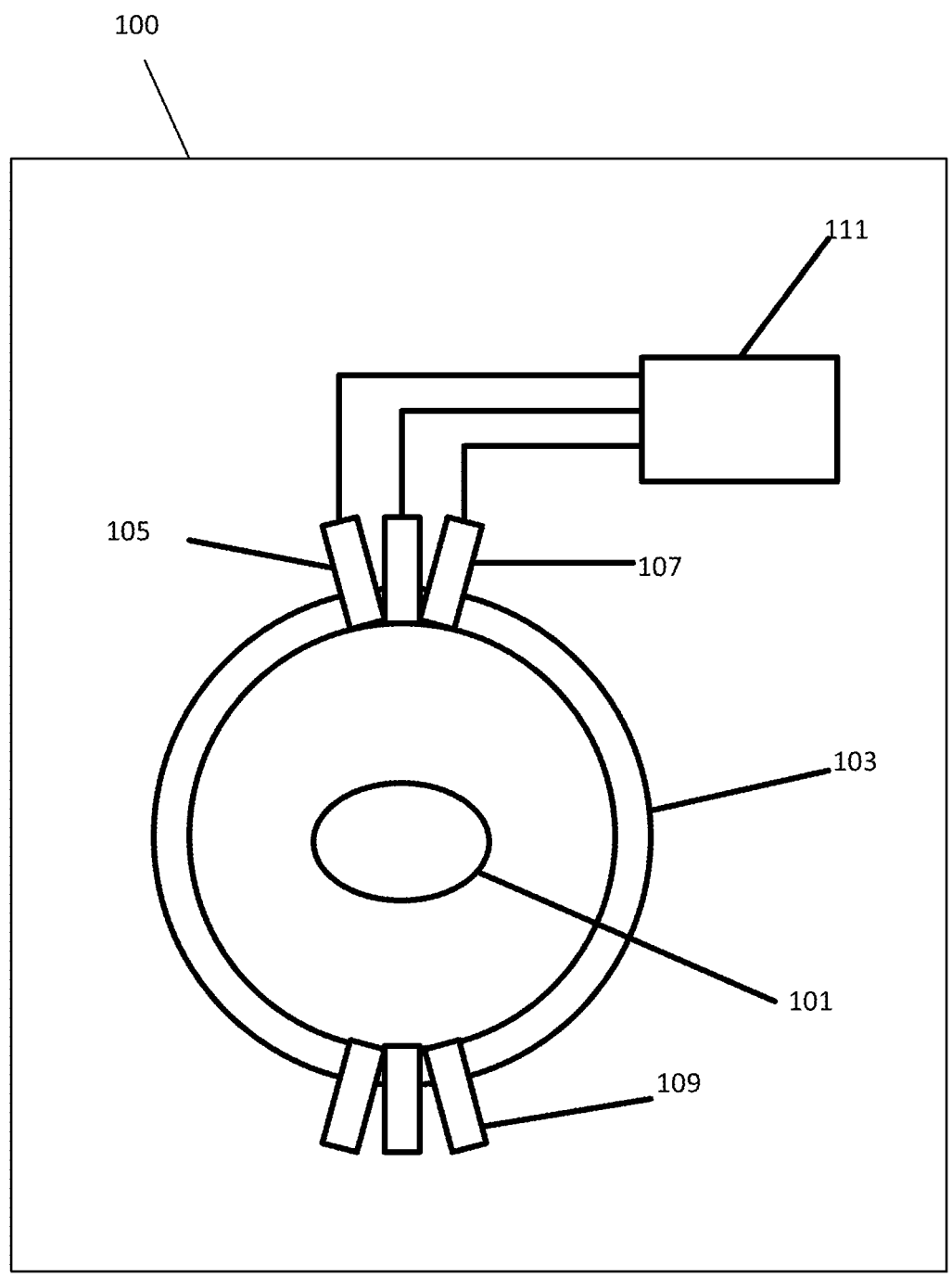
FIG. 1 depicts one embodiment of a PET system.

FIG. 1 depicts an embodiment of an example PET system 100 (composite detector). The PET system 100 is a generalized example. Additional, different, or fewer components may be provided.

An object 101, for example a patient, is positioned within a detector ring 103 including detector units 105, 107, 109. Additional detector units may be provided, such as providing four, eight, twelve, sixteen or more detector units. The detector units 105, 107, 109 may include scintillator crystals that convert energy from a photon into many lower-energy light photons. The detector units 105, 107, 109 may further include photomultipliers (PMT), silicon photomultipliers (SiPM) or other light detectors such as avalanche photodiodes (APD), that convert the light into an electronic pulse. The detector units 105, 107, 109 are connected to a processing unit 111 that collects the pulse data from the detector units 105, 107, 109. The processing unit 111, using hardware, software or hardware and software may reconstruct the pulse data into images or store the data in a memory.

The memory in the processing unit 111 is a random access memory, graphics processing memory, video random access memory, system memory, cache memory, hard drive, optical media, magnetic media, flash drive, buffer, database, combinations thereof, or other now known or later developed memory device for storing data.

For a PET detector 100, a radiotracer that emits the positrons is introduced into the object 101. After a positron is emitted, the positron travels a short distance in the object (generally tissue), losing energy by exciting and ionizing nearby atoms. Once the positron has lost almost all kinetic energy, the positron annihilates with a nearby electron. The product of the annihilation is a pair of photons. The two photons depart in opposite directions as gamma rays. The photons impact scintillator crystals in the detector units 105, 107, 109 and the impacts are identified as an incident. When a detector unit identifies an incident, the detector unit generates a signal. The creation of two signals at the same time ("in coincidence") is an indication that there was an annihilation somewhere in the column or line of response (LOR) connecting the associated detectors. During a scan, coincidence counts are recorded for each LOR. The number of coincidence counts obtained on a particular LOR indicates an amount of gamma ray pairs traveling along that line during the scan. The data is stored in memory. From the line of response data, 2D and 3D images may be generated using image processing, such as reconstruction.

A PET detector 100 may include multiple detector units which may be grouped into separate composite detectors. Each composite detector may include a separate processing unit 111. The composite detectors may operate individually or in concert with other composite detectors. In FIG. 1, for example, each of the detector units 105, 107, 109, may represent a composite detector that includes multiple (for example, a 2×2 array) detector units).

An imaging gamma-ray detector unit may provide multiple sets of information. For example: the energy deposited of the incident gamma interaction, the spatial location of the incident gamma interaction, and the time of arrival of the gamma ray. A way of identifying the spatial information is by using pixelated scintillation crystals and capturing a signal from a crystal when the incident gamma energy is deposited into the crystal. The ideal smallest detector unit is one crystal with a photo-sensor coupled to the crystal, and readout electronics that captures the incident gamma energy and trigger logic detecting the time of arrival. This may be called a "one-to-one coupling" method. However, the cost of having many read-out channels may be very high for one-to-one coupled detectors, and timing readout logic may not achieve the statistically optimum timing resolution. Instead multiple crystals may be grouped into a single optically coupled detector unit. Separate detector units have separate control (e.g., voltage bias levels) and/or detection circuitry (e.g., timing signal generation). By grouping multiple crystals into a detector unit, the position and energy signals are multiplexed into fewer signals, and a single timing signal is created to generate a single event arrival time measurement. The identity of which crystal is impacted may be ascertained by use of a crystal map. A crystal map may describe the location of the crystals in relation to the PMT (or photo detector) array that generates the signal.

Background events such as random events from the intrinsic radioactivity of the detector units may be detrimental to creating an accurate image. However, the intrinsic radioactivity may be useful in that the intrinsic radioactivity may be used to configure or setup a composite detector without using additional radiation sources. A PET detector and/or individual detector units may require settings and calculations to be configured correctly to generate accurate information. Such settings and calculations include an optimal SiPM array bias voltage setting, an optimal discriminator threshold setting for timing pick-off, SiPM non-linear response correction, time-walk correction table calculation, crystal position map generation, time-alignment, and/or background peak tracking. Additional, different, or fewer settings may be used.

These settings and calculations may be calibrated with multiple radiation energy sources, especially when correcting for SiPM non-linearity. A configuration may benefit from measuring detector timing performance while varying SiPM bias voltage and LE discriminator trigger level in order to find optimal set points for bias voltage and LE trigger level.

In conventional systems, a separate point source of radiation may be used to configure a detector. However, without using a separate source, the above mentioned pre-requisite set-ups may be accomplished by using only background activities generated by the detector. The background radiation activity produces beta decay following with coincidental gamma ray generation. Background coincidence events happening between two adjacent detector units within the PET detector may be utilized to conduct the set-up processes. For example, multiple small detector unit based lutetium oxyorthosilicate (LSO) scintillators may have self-coincidence events between detector units from LSO background activities. The detected coincidence events and known energies may be used for setting up a composite detector automatically.

Data Acquisiton

Figure 2:
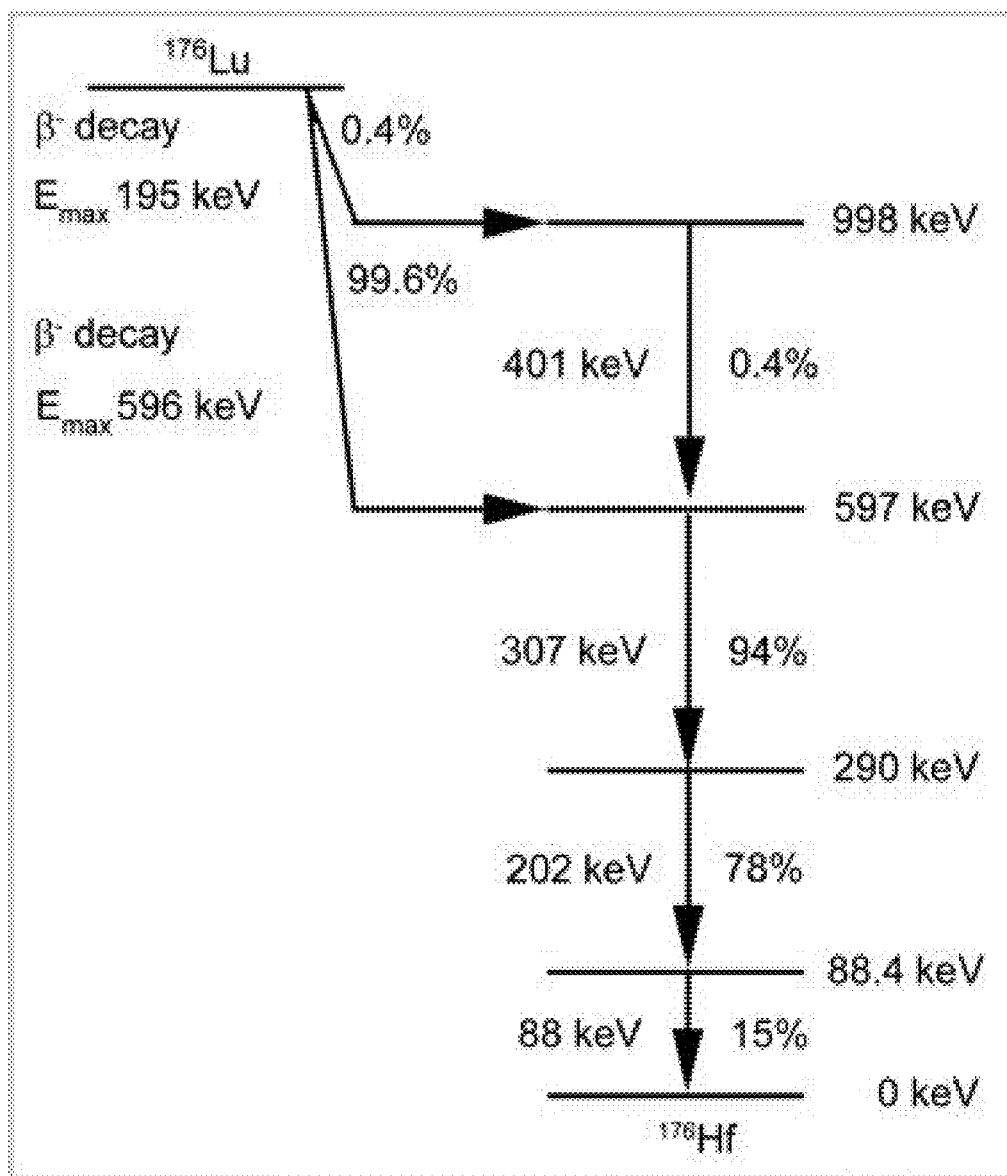
FIG. 2 illustrates a Lu-176 decay example.

The isotope Lu-176 occurs naturally in a LSO scintillator. Lu-176 decay produces a radiation event including a beta particle (the maximum energy of 596 keV-596,000 electron-volts) and three gamma (88 keV, 202 keV and 307 keV) particles in coincidence. FIG. 2 illustrates the Lu-176 decay scheme. The radioactive decay may be identified by detectors with certain design characteristics, and used for detector self-setup and self-calibration. While Lu-176 is used in the following examples, the detectors may use alternative materials to produce a radiation event. For example, a radioactive substance can be added to the composition of a scintillator without or with less intrinsic activity. Alternatively, an additional source with very low activity can be added to the detector but outside of the scintillator crystals.

Figure 3:
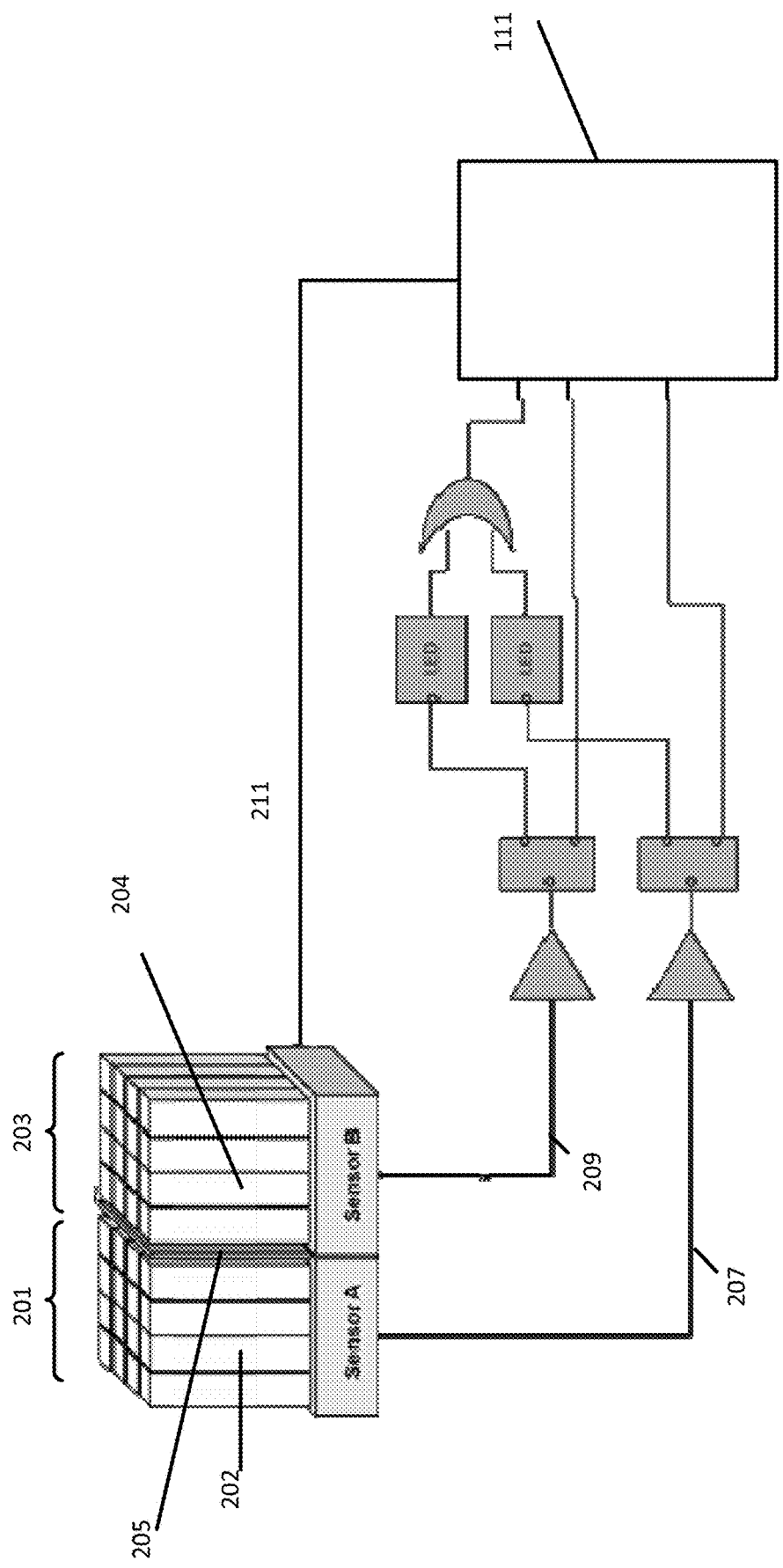
FIG. 3 illustrates a data acquisition system according to an embodiment.

FIG. 3 illustrates an example data acquisition setup using two SiPM detector units 201, 203, scintillator crystals 202, 204, communications path 211 for position and energy information, detector unit separate communications paths 207, 209 for timing, and the processing unit 111. Additional, different, or fewer components may be provided.

A simple radiation detector may be a composite of an array of detector units where each detector unit is optically isolated. For example, each array may comprise four detector units arranged in a 2×2 pattern. Other number or patterns of detector units may make up the array or radiation detector. Optical isolation may be provided by an air gap, adhesive, or other material. Each detector unit 201, 203 also has separate control and timing circuitry from the other detector units 201, 203. A different communications path to the processing unit 111 is provided for the timing, position, and energy information from each detector unit 201, 203.

FIG. 3 illustrates two adjacent detector units 201, 203 that are each made up of a one or more scintillator crystals (202, 204), here shown as a 4×4 lutetium oxyorthosilicate (LSO) crystal array. Other array configurations may be used. As shown in FIG. 3, an optical barrier 205 (space between detector units) of two layers air coupled VM reflector without PSA (pressure sensitive adhesive) may be used to isolate optical light within each detector unit. The detector block design may be adapted to different scintillator crystal arrays with differently sized crystals (pixels) (for example, 2 to 4 mm square) in differently dimensioned arrays (3×3 to 8×8 or larger), and SiPM sensor sizes (for example, 3 to 6 mm square) and array dimensions (3×3, 4×4, and larger). As shown, a 4×4 LSO crystal array is bonded on each SiPM array. A SiPM array may include multiple small avalanche photo-diodes (so-called microcells). Each microcell is connected to a common electrode structure. When a reverse bias is applied to the microcells at a voltage higher than the breakdown voltage, each microcell operates in Geiger mode and provides a single photon counting capability. A LSO scintillator length in PET scanners may be 20 mm to stop majority of 511 keV events. The detector unit size may be smaller than 20 mm to have 307 keV gammas penetrate enough from one side to the other.

A radiation event (also referred to as self-activity) in any of the scintillators (202, 204) in a detector unit may trigger the processing unit 111 for data collection. There may be two different types of modes. A first mode, referred to as 'singles mode' occurs when data is collected only from the triggers from any single detector unit. A second mode, referred to as 'coincidence mode' occurs when the event is collected only when both of the triggers from two adjacent detector units fall into a short time window (for example, a few nanoseconds). Background activity may occur and be acquired at any time, such as (1) prior to a scan and during setup or (2) during a scan or after a scan has completed.

In FIG. 3, two detector units 201, 203 are adjacent to each other. The energy signals and separate timing signals from two detector units 201, 203 are digitized using a digitizer 207. In this example, the timing signal from each detector unit is split into two. One signal goes to LED ASIC, and the other signal, the raw timing pulse, is fed to the processing unit 111. The two LED ASIC output signals are summed and used for the trigger to the processing unit 111. The raw timing signals are used for time mark calculation using digital timing. The arming threshold on the LED ASIC may be set to capture all the pulses with small energy down to 50 keV level events.

Figure 4:
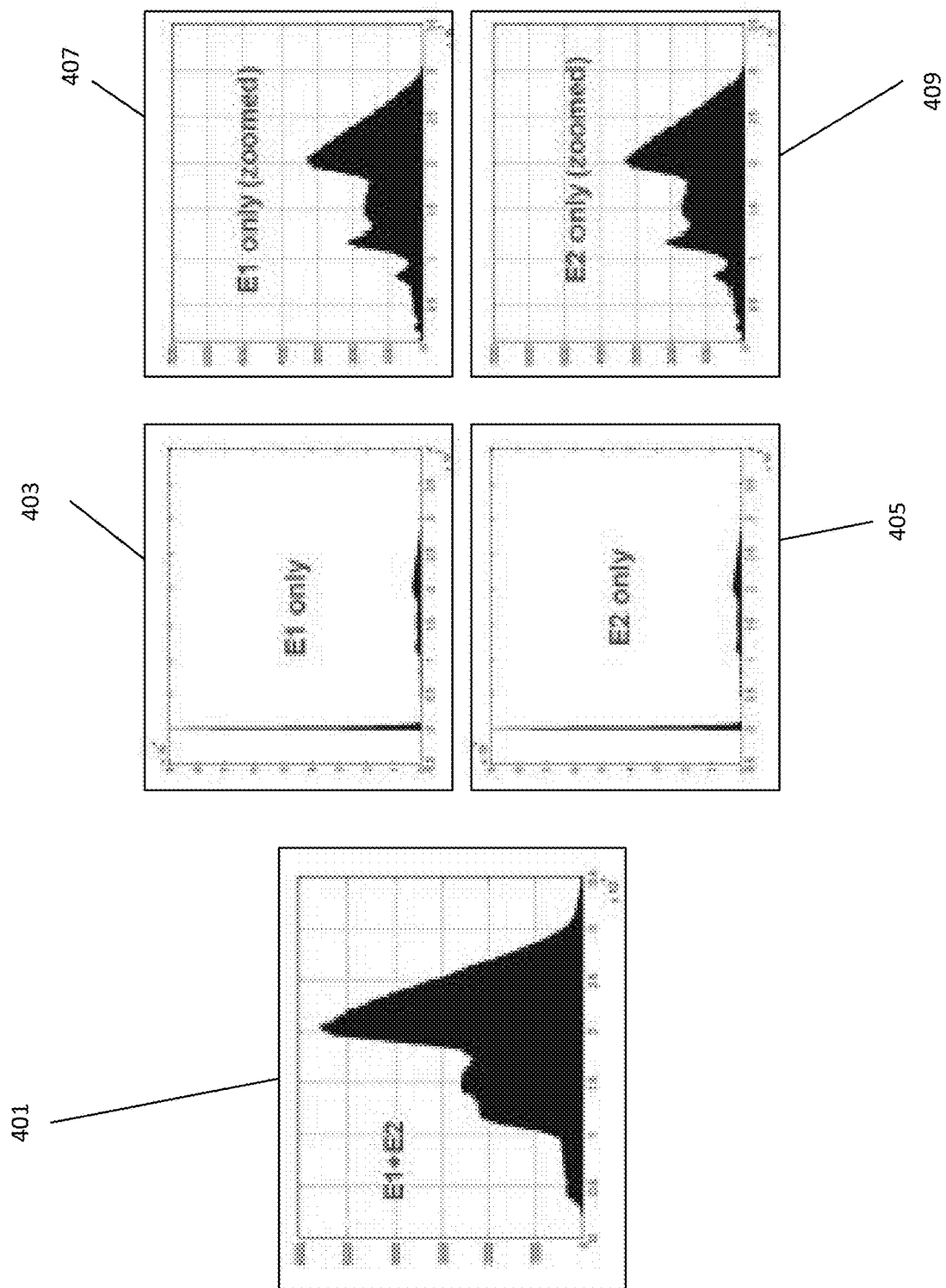
FIG. 4 illustrates example energy spectrums of acquired data.

FIG. 4 illustrates energy spectrums of acquired data from the two detector units described above in FIG. 3. The graphs in FIG. 4 show histograms of energy of all the decay events occurring in both detector units of FIG. 3. The data is acquired in 'singles mode', and the graph 401 is the spectrum of total energy where the energies from two detector units are summed together while the graphs 403 and 405 are spectrums when only looking at the energy signal in each detector unit. The big low energy peaks indicate that the background event happens on the other detector unit. For the graphs 403, 405 (and zoomed versions 407, 409) there is an indication of 202 keV and 307 keV gamma peaks, but the peaks are not pronounced. As shown, the LSO background event includes the beta and gamma coincidence. By identifying the time-mark information from two detector units E1, E2, the coincidence events may be selected out. The time mark extraction may be done by other methods, for example, the time mark may be identified digitally by capturing the whole timing pulse and post-processing of the timing pulse with a time mark calculation algorithm.

Figure 5:
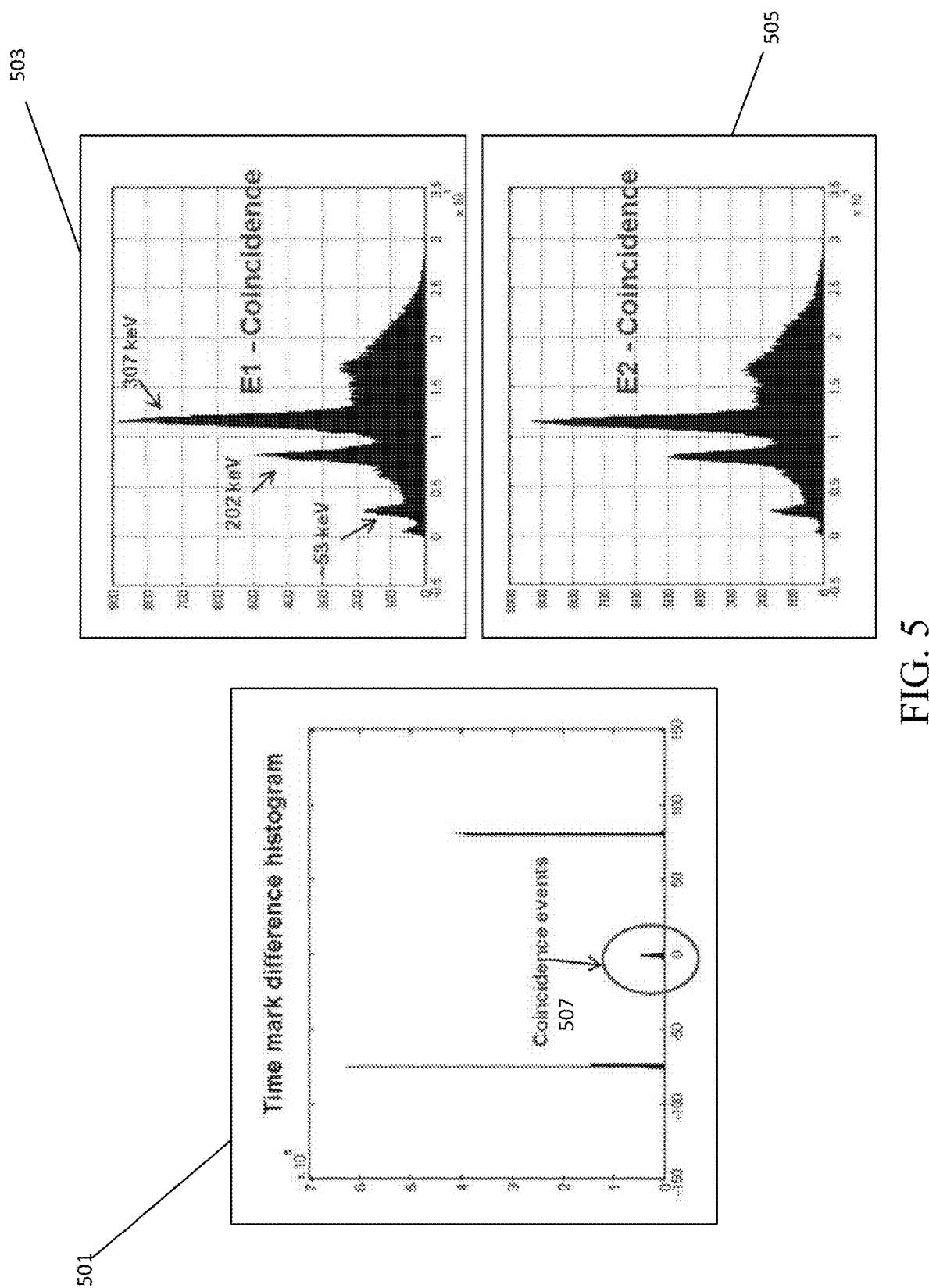
FIG. 5 depicts an example time-mark difference histogram.

FIG. 5 depicts a time-mark difference histogram of the two detector units from FIG. 3 on the graph 501. The group of events inside the circle 507 are the coincidence events from the two detector units. The two events both have time marks at very narrow time windows (e.g., coincidence window set to 4 ns) so that the difference of two time marks is small. The other two left and right peaks are where the time marks are produced from only one block. With one block, the peaks are either positive or negative values when subtracting two time mark information because the time mark, when there is no timing signal, is set to zero. The energy spectrums of the coincidence events are displayed in the right two graphs 503 and 505 for E1 and E2 respectively. The two 202 and 307 keV gamma event peaks are more clearly displayed after the coincidence qualification compared to shown in singles mode acquisition in FIG. 4. The 88 keV gammas may be absorbed by LSO and may not scatter into the next detector unit. The Lutetium K-shell fluorescence X-ray (~53 keV) may appear as another distinctive peak.

During a PET scan, there may be multiple inter detector unit scatter events. The scatter events may also be registered as coincidence events between detector units. The scatter events may also include Lutetium background coincidence events. An energy window for each detector unit, somewhat above the standard PET 511 keV window (used to detect positron annihilation radiation from within the imaging volume), may be used to detect many of the background beta decays along with the coincident gamma event on the adjacent detector units. The background event may be detected separately from other events using the energy window. These background beta decays may be identified and stored.

Figure 6B:
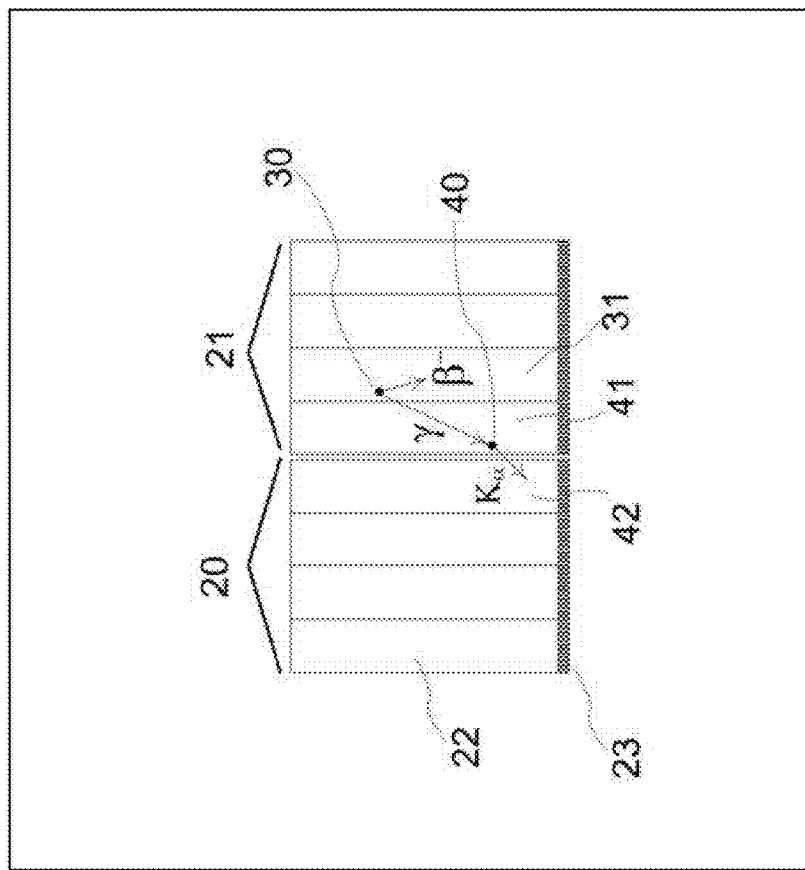
FIGS. 6A and 6B illustrate two examples of coincident events.
Figure 6A:
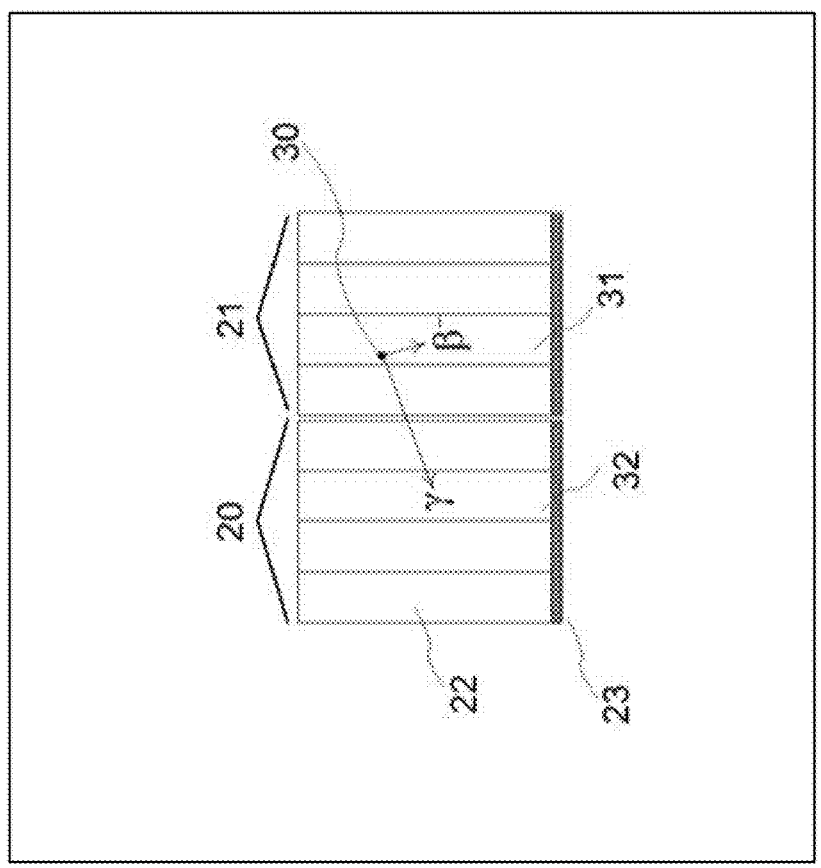

FIGS. 6A and 6B illustrate two additional examples of coincident events arising from intrinsic radiation (i.e., background radiation from Lu-176). FIG. 6A depicts a PET detector or part of a composite detector, showing adjacent subunits 20 and 21, each including a light sensor array (for example an array of SiPMs) 23, and a plurality of scintillator crystals (e.g. pixels) 22, 31, 32. A Lu-176 beta decay within one pixel 31 may deposit the beta kinetic energy in the vicinity of the Lu-176 atom 30, while the coincident gamma emission escapes to the adjacent detector unit pixel 32 and deposits its energy there. Thus, coincident events are detected in the two detector units, one with the beta energy and the other with the gamma energy (for example 307 keV). The coincidence with the beta event identifies the 307 keV emission as self-activity, having the mean detected energy 307 keV, and having an average timing delay relative to the beta event timing that reflects the average gamma transit time between the two pixels, that are at a known distance and thus a known average time of flight difference.

FIG. 6B depicts a PET detector or part of a composite detector, showing two adjacent subunits 20, 21, each including a light sensor array (for example an array of SiPMs) 23, and a plurality of scintillator crystals (pixels) 22, 31, 41, 42. A Lu-176 beta decay within one detector unit pixel 31 may deposit the beta kinetic energy in the vicinity of the Lu-176 atom 30, while the coincident gamma emission energy is absorbed in a nearby pixel 41 by photoelectric absorption at Lu atom 40. A characteristic x-ray emission from the Lu atom 40 (most often approximately 53 to 54 keV) may escape to a pixel 42 of an adjacent detector unit and deposit its energy there. Event sequences such as this (other particular arrangements of energy deposition are possible) describe the presence of the Lu escape x-ray peak seen in the coincidence event energy spectra.

For each detected event, at least one time mark as well as energy deposition and position information are collected, from the detector unit within the composite detector in which the event was detected. In the case of scatter between the composite detector's separate elements, the composite detector may produce a time mark, and energy deposition and position information for energy depositions within each separate scintillator crystal.

The time-mark, energy, and location information derived from the background radiation may be stored in memory or further processed to generate parameters for the detector. The memory stores PET input data, such as energy and position signals from PET detector units. The memory stores data as processed, such as storing detected events, line of response, or other data. The event data for processing may be stored or provided directly to the processing without storage. Alternatively, a separate or different memory is used for PET input data and/or detected events.

Processing

The coincidence acquisition of intrinsic radiation events by adjacent detector units may be used by the processing unit 111 for calibration of the PET detector and individual detector units' time and energy calibration. The coincidence events may further be used for the setting of parameters to optimize detector performance (e.g. leading edge thresholds and operating bias voltages to optimize timing performance). The coincidence data acquisition may be used to evaluate the timing performance of the detector units.

The timing measurement may be used for finding optimal operation parameters, such as bias voltage of photo-sensors and threshold setting of leading edge discriminators. An energy window may be applied to select out only the events having 307 keV energy on one detector unit, and another narrow window around 511 keV on the other side to measure the coincidence timing of 511 keV vs 307 keV gamma coincidence events. Other windowing combinations may be used. The measurement may be repeated with different voltages and leading edge discriminator thresholds to find optimal parameters for the detector units and the PET detector.

Figure 7:
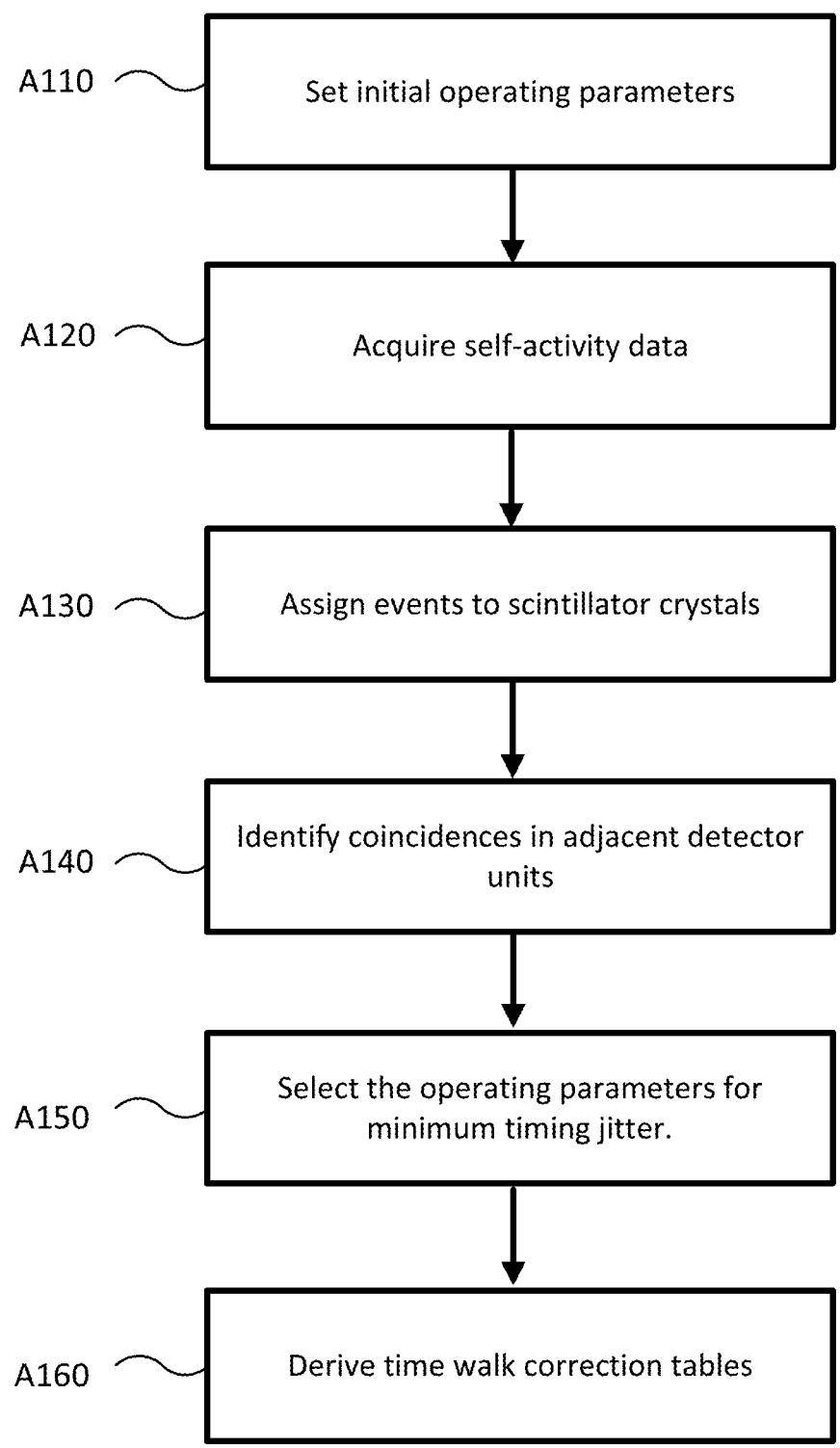
FIG. 7 depicts one embodiment of a flowchart for a method of setting up of a detector.

FIG. 7 depicts a flowchart for setup of a PET detector. Optimizing PET detector performance may involve finding the SiPM bias voltages and/or timing discriminator levels that give a best or sufficient coincidence resolving time in the scanner. A power source may reverse-bias the photo detector array to a bias voltage that is up to a few volts above the breakdown voltage of a photodiode.

Setup parameters for the detector units may be determined first. The correction table generation follows for the detector operation with the determined parameters. Signal drift is compensated to maintain all the signal levels to be same to the pre-determined levels with the optimal parameters As presented in the following sections, the acts may be performed using any combination of the components indicated in FIG. 1. The following acts may be performed by the processing unit 111, an imaging unit, a separate processor, or a combination thereof. Additional, different, or fewer acts may be provided. For example, act A160 may not be performed. The acts are performed in the order shown or other orders. The acts may also be repeated. For example, Act 120 may be repeated to acquire multiple sets of self-activity data. Certain acts may be skipped.

At act A110, initial operating parameters are set for all detector units in the PET detector. For a SiPM based PET detector, the operating parameters may be the values of SiPM operating bias voltage ($V_{op}$), set at a fixed value above the breakdown voltage ($V_{br}$), determined from data measured at manufacture for each SiPM, as well as the leading edge timing discriminator threshold voltage ($V_{LE}$). Additional, different, or fewer operating parameters may be used.

At act A120, the detector units acquire self-activity event data. The event data is acquired at multiple operating voltages $V_{op}$, and at each operative voltage at multiple leading edge threshold values $V_{LE}$. The self-activity event data may include the time-mark, energy, and/or location information derived from the background radiation events. The data may be collected, acquired, or derived for each individual pixel or detector unit.

Act A120 is repeated one or more times in order to acquire multiple sets of data. For example, background or intrinsic events are detected over minutes, hours, or days, resulting in tens, hundreds, or thousands of detected events.

At act A130, the processing unit 111 assigns events within detector units to individual scintillator crystals (pixels). The processing unit 111 may generate histogram event locations for each $V_{op}$ and derive crystal region maps in order to assign events. The data received from the detector units is processed to determine the location (e.g., scintillation crystal or pixel) at which the event occurred.

At act A140, the processing unit 111 identifies, from the events, coincidences in adjacent detector units (position and energy for beta energies above 511 keV window and 202 keV and 307 keV gamma events, and time marks for beta and 307 keV gamma events). The energy window and timing are used to identify coincident events. Given the various settings for the operation parameters used over time, a collection of coincident events occurring at each operating parameter combination is created. For example, coincident events at a given operating voltage and leading edge threshold are identified. Other coincident events at other operating voltages and/or leading edge thresholds are identified.

The processing unit 111 finds the beta—307 keV event timing jitter value averaged over detector unit scintillation crystals, as a function of $V_{LE}$, for each $V_{op}$. The processing unit 111 measures the mean crystal timing jitter for each Vop and V_LE, and select one Vop and V_LE pair which gives the minimum timing jitter.

At act A150 the processing unit 111 selects the $V_{op}$ and $V_{LE}$ combination for minimum timing jitter. The processing unit 111 may select $V_{op}$ and $V_{LE}$ for each detector unit. The selection may be adjusted for any systematic difference between operating voltages for best timing with 511 keV and 307 keV.

Figure 8:
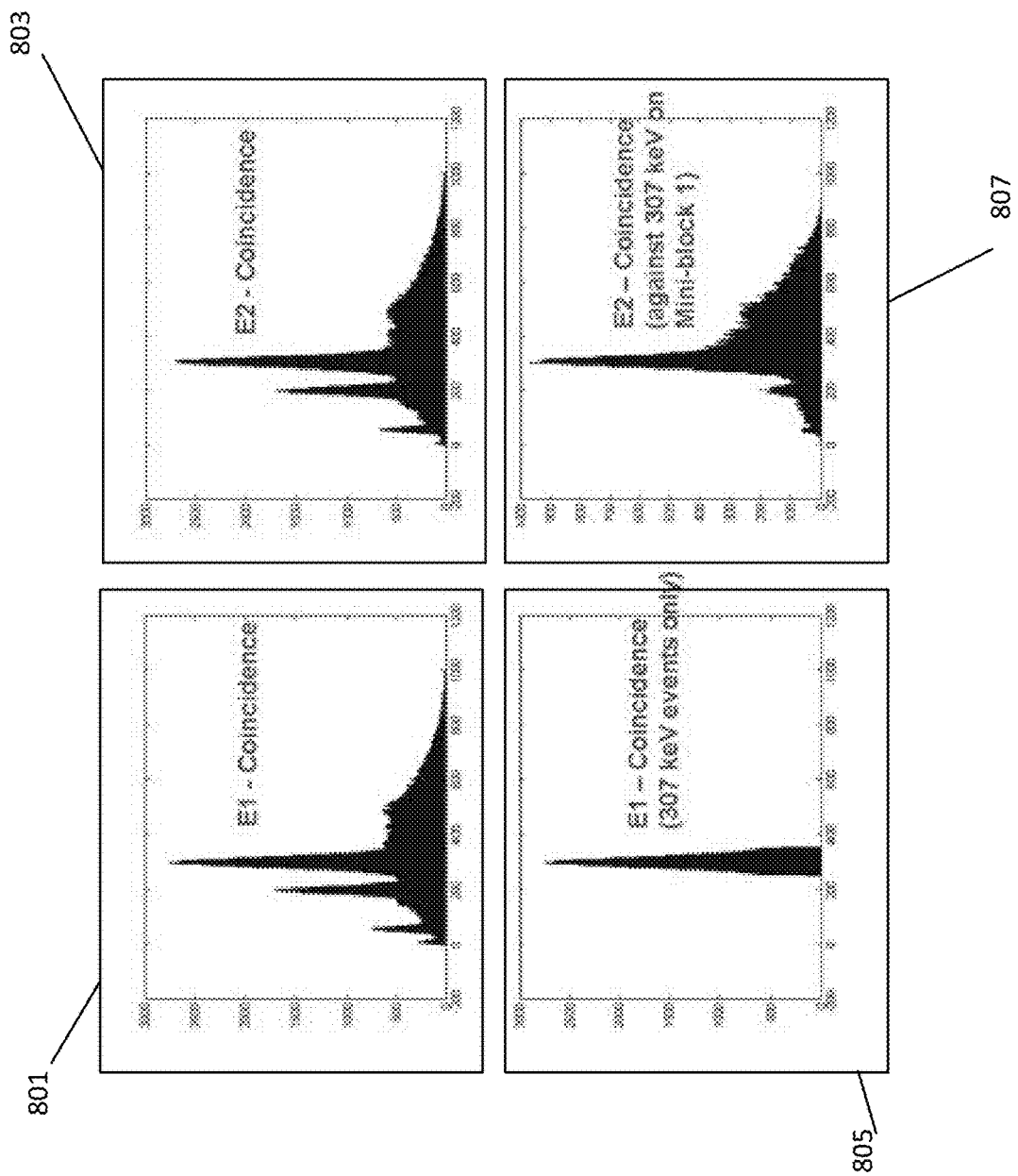
FIG. 8 depicts example energy spectrums.

The deposited energy by beta has a fairly broad energy spectrum including 511 keV energy, so the timing performance on one detector unit E1 with 511 keV energy qualification while having 307 keV energy qualification on the other side detector unit E2 may be used for finding optimal timing parameters (SiPM bias voltage and LE trigger threshold). FIG. 8 depicts the energy spectrums of the LSO background coincidence events (top graphs 801, 803), and the ones after applying energy qualification on the detector units E1 and E2 to 307 keV event (bottom graph 805, 807). Energy qualification may entail windowing the results to a range of energy such as the decay energies for Lu. As the graph 807 shows, the energy spectrum is broad enough to qualify event for 511 keV energy so that the timing performance measurement for the detector unit E2 with 511 keV energy qualification may be performed by varying the LE trigger threshold.

Figure 10:
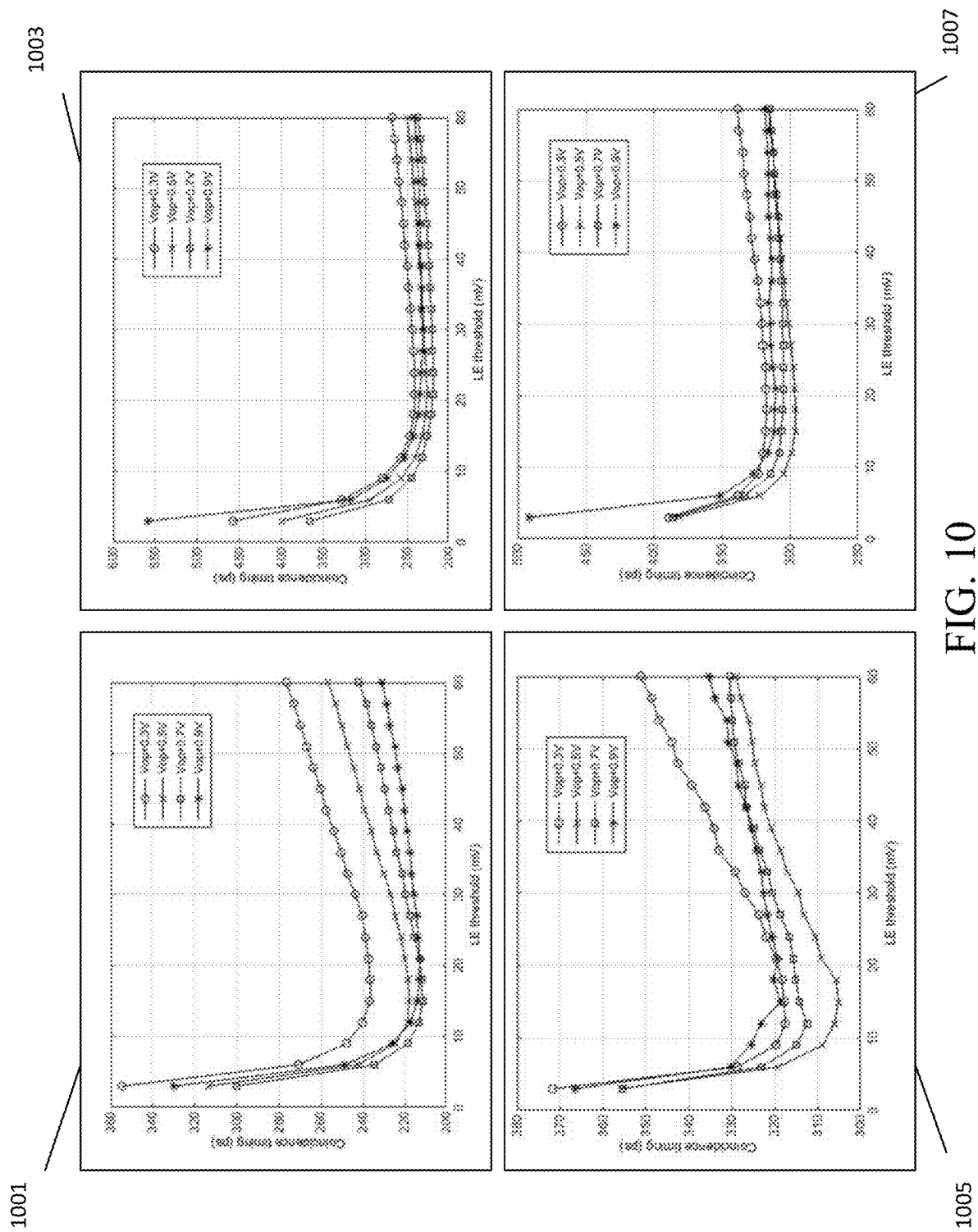
FIG. 10 illustrates an example timing result.

FIG. 10 illustrates a timing result. In this example, the normal coincidence timing measurement is performed using a Ge-68 point source against a reference PMT detector, and the mean coincidence crystal timings are measured at different bias voltages and LE threshold levels. The top two graphs 1001, 1003 show timing curves for a first detector unit (1001) and a second detector unit (1003). The observed optimal bias voltage is approximately 0.7V above the vendor specified operating voltage (Vop). If there is not enough bias voltage due to the PDE and gain drop, timing is degraded. Timing may also be degraded if the bias voltage is increased too much due to the dark noise increase. The bottom two graphs 1005, 1007 are timing curves produced with LSO background coincidence events. The overall curve shapes are well matched while the optimal bias voltage is set at little lower (0.5V above Vop) than the normal timing measurement setup (0.7V above Vop).

The 300 ps level LSO background beta and gamma coincidence timing may also be worse when only considering the degrading factor from the lower energy of gamma (307 keV instead of 511 keV). One factor may be a DOI effect that creates a large path light transport time difference. Each SiPM bias voltage may be set at the lowest bias voltage (the lowest bias voltage may be set roughly based on vendors SiPM spec.) to calculate timing resolutions, 307 keV (block 1) vs 511 keV (block2) and 511 keV (block1) vs 307 keV (block2), with different LE trigger thresholds. This may be repeated by increasing bias voltage with a proper step size, for example, 0.1V for HPK devices.

Referring again to FIG. 7, at act A160, using the event data taken with the best $V_{op}$ and $V_{LE}$ settings, the processing unit 111 derives time walk correction tables, energy scaling and/or any necessary non-linearity corrections for the detector unit scintillator crystals. The derivation of time walk correction tables, energy scaling, corrections, and time alignment is described below in more detail.

Some of the operational parameters (e.g. the bias voltage or LED threshold) may be determined by iteratively. Some of the acts described above may be repeated. For example, the processing unit 111 may set a new value for an operating parameter. The processing unit 111 performs a new time alignment. The processing unit 111 calculates an average timing resolution for crystals that are affected by the parameter change. A next value is determined for the operational parameter (that may be predicted to have an even better timing resolution). These steps may be repeated until the best timing resolution is found.

Time Walk Correction

Time walk correction is important for inter detector unit scattered events where the 511 keV energy is split and deposited into two detector units. In this case, the time-walk from the scattered event signal may be large, and may need to be corrected to avoid a distorted timing histogram. Calculating the time-walk correction factor with LSO background event information may be performed after finding optimal SiPM bias and LE trigger threshold. The time-walk factor for a first detector may be calculated as follows. Coincident events are acquired where the amount of deposited energy in the second detector is close to 307 keV as shown in FIG. 8, graph 805. The events are then grouped by the energy in the first detector into multiple energy bands. For each of these energy bands, the timing histogram and the center of the timing histogram are calculated. As the graph 807 shows the energy spectrum as broad, the relative mean time-mark locations (the center of Gaussian fit of the timing histogram) at different energy bands may be calculated. The relative time-walk difference to the one at the 511 keV energy level is the correction factor for the time-walk at each energy level. The correction values may be stored in a memory. The curve is not smooth due to the limited data statistics, but with iteration, a smoothed correction curve may be generated. There may be alternative ways of finding the corrections, for example, using Breuer's statistical method.

Non-Linearity Correction

Due to the finite number of microcells to detect photons, and the SiPM response with respect to the impinging number of photons, the data may exhibit non-linear behavior. The non-linear response may be fit by an exponential function with two model parameters (A and B) as shown in the equation below:

$$E_m = A\left(1 - e^{-\frac{E_{nc}}{B}}\right) \qquad \text{Equation (1)}$$

Enc is the actual gamma energy producing scintillation photons. Enc is fairly linear to the gamma energy deposited to scintillators. Em is the measured SiPM signal that shows the non-linear behavior. From a Gaussian fit on the 202 keV and 307 keV peaks on the coincidence event energy spectrum, the corresponding measured energy values may be determined. With the energy values, the parameters A and B in the equation (1) may be found. The non-linearity corrected energy may be calculated using the following inverse equation of (1):

$$E_{nc} = B\log\left(1 - \frac{E_m}{A}\right) \qquad \text{Equation (2)}$$

As an option, the Lutetium escape peak location may be also used as extra information to make the fit more stable for finding parameters A and B in equation (1).

Figure 9:
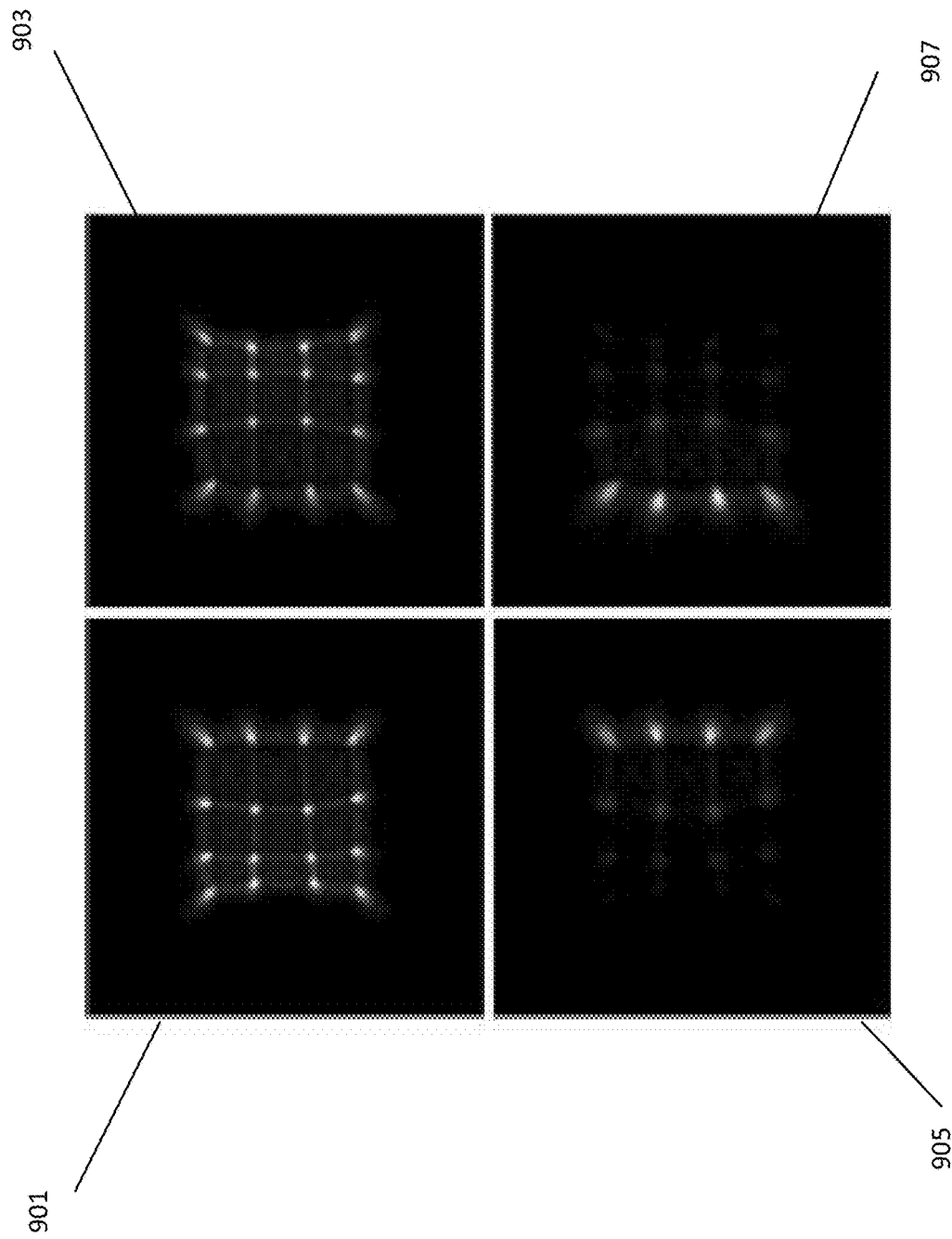
FIG. 9 illustrates an example crystal map.

FIG. 9 illustrates a crystal map for two adjacent detector units. The top two maps 901, 903 are position maps on each detector unit with all the background events acquired ('singles mode' acquisition), and the bottom two maps 905, 907 are the ones acquired in 'coincidence mode' (i.e., the beta-gamma coincidence events are detected in both detector units). As shown in 905 and 907, the number registered of events is decreasing as the crystal location moves away from the boundaries. This indicates that the detector unit size cannot be too large (>20 mm for LSO) in order to acquire the beta-gamma coincidence events for all the crystals in detector units.

Crystal Time Alignment: Detector (unit) and Scanner Level

Figure 11:
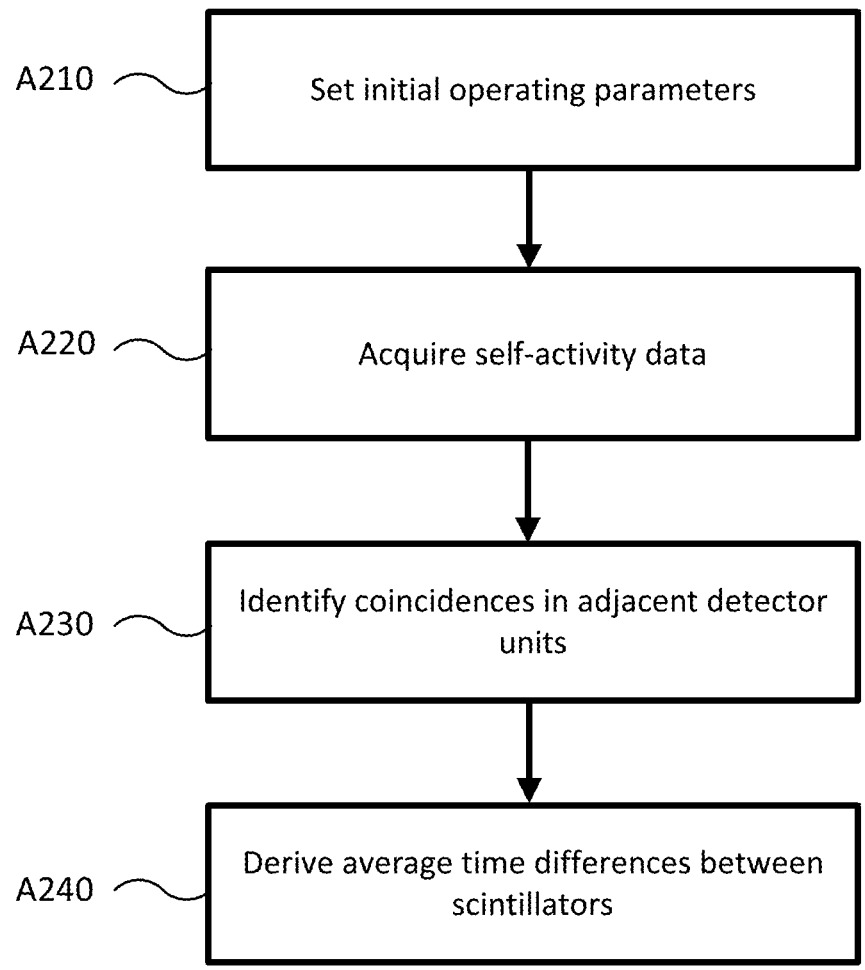
FIG. 11 depicts one embodiment of a flowchart for detector time alignment.

FIG. 11 depicts a flowchart for detector time alignment. The flowchart describes a method for determining the systematic mean timing differences between all scintillator crystals relative to the detector units, and the mean timing differences between the detector units. The measured time differences from the events in the first level time alignment is corrected for the time-of-flight that depends on the distance between the two scintillator crystals. Time alignment may be used to calculate individual timing offsets for each of the crystals or detector units. These offsets may then later be deleted from the time marks in the post-processing of events in actual patient or object scans.

As presented in the following sections, the acts may be performed using any combination of the components indicated in FIG. 1. The following acts may be performed by the processing unit 111, an imaging unit, a separate processor, or a combination thereof. Additional, different, or fewer acts may be provided. In Act 210, the parameters may have been previously calculated. The acts are performed in the order shown or other orders. The acts may also be repeated. For example, at act A220 may be repeated to collect multiple sets of data. Certain acts may be skipped.

At act A210, the processing unit 111 sets the previously determined optimum $V_{op}$ and $V_{LE}$. $V_{op}$ and $V_{LE}$ may have been determined using the method illustrated in FIG. 7.

At act A220, self-activity event data is acquired. For each detected event, at least one time mark as well as energy deposition and position information are collected.

At act A230, the processing unit 111 identifies coincidences in adjacent detector units using the position and energy data for beta energies above 511 keV window and 307 keV gamma events, and time marks for beta and 307 keV gamma events.

At act A240, the processing unit 111 corrects for average gamma transit times between beta and gamma scintillator crystal locations to derive average time differences between scintillator crystals, and also average time differences between each detector unit and its scintillator crystals and between detector unit averages. The overall time delay for a scintillator crystal may then be the sum of the relative time delay and the time delay of the containing composite detector relative to the other composite detectors. Once the delays are known, the processing unit 111 may calculate correction terms for energy dependent time delays.

Figure 12:
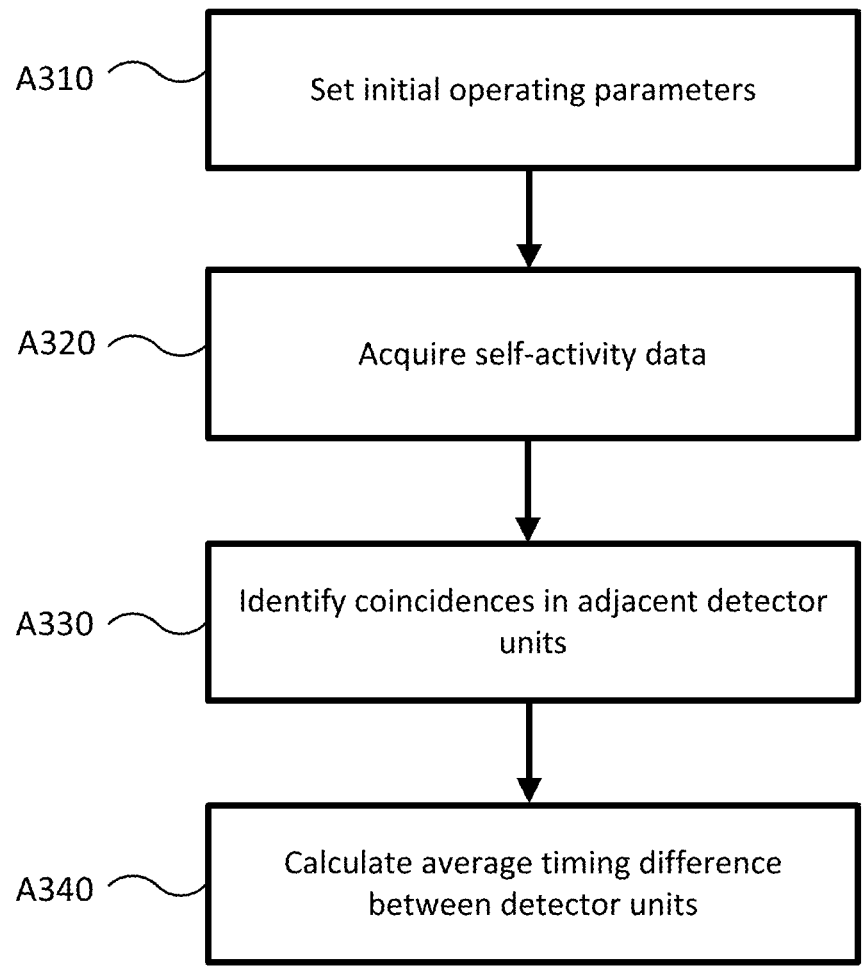
FIG. 12 depicts one embodiment of a flowchart for scanner time alignment.

FIG. 12 depicts a flowchart for scanner time alignment. The flowchart describes a method for determining the average timing differences between all detector pairs used in scanner coincidence acquisitions, and/or the average timing differences between all detector unit pairs used in scanner coincidence acquisitions.

As presented in the following sections, the acts may be performed using any combination of the components indicated in FIG. 1. The following acts may be performed by the processing unit 111, an imaging unit, a separate processor, or a combination thereof. Additional, different, or fewer acts may be provided. The acts are performed in the order shown or other orders. The acts may also be repeated. Certain acts may be skipped.

At act A310, the processing unit 111 sets the previously determined optimum $V_{op}$ and $V_{LE}$ for all detector units. $V_{op}$ and $V_{LE}$ may have been determined using the flowchart shown in FIG. 7.

At act A320, self-activity event data is acquired for one or more detector units. In addition to the self-activity events, event data from a centrally positioned positron emitting source may also be collected during this act. A centrally positioned positron emitting source may be a cylinder phantom. The events from the phantom may be processed alongside the self-activity events. For each detected event, at least one time mark as well as energy deposition and position information are collected.

At act A330, the processing unit 111 identifies coincidences in detectors and/or detector units across from each other within a PET detector ring, due to self-activity (beta and 307 keV gamma pairs) or positron annihilation radiation (511 keV gamma pairs) from the cylinder phantom.

At act A340, the processing unit 111 solves for average timing differences between all detector pairs used in scanner coincidence acquisitions, and/or the average timing differences between all detector unit pairs (both adjacent and across the ring) used in scanner coincidence acquisitions. The timing differences are used to build time alignment tables. Using both sets of events (self-activity and event data from a phantom) may allow the processing unit 111 to compare difference from both adjacent detector units and those across the ring allowing for a more efficient and quicker configuration.

Detector Stabilization

Figure 13:
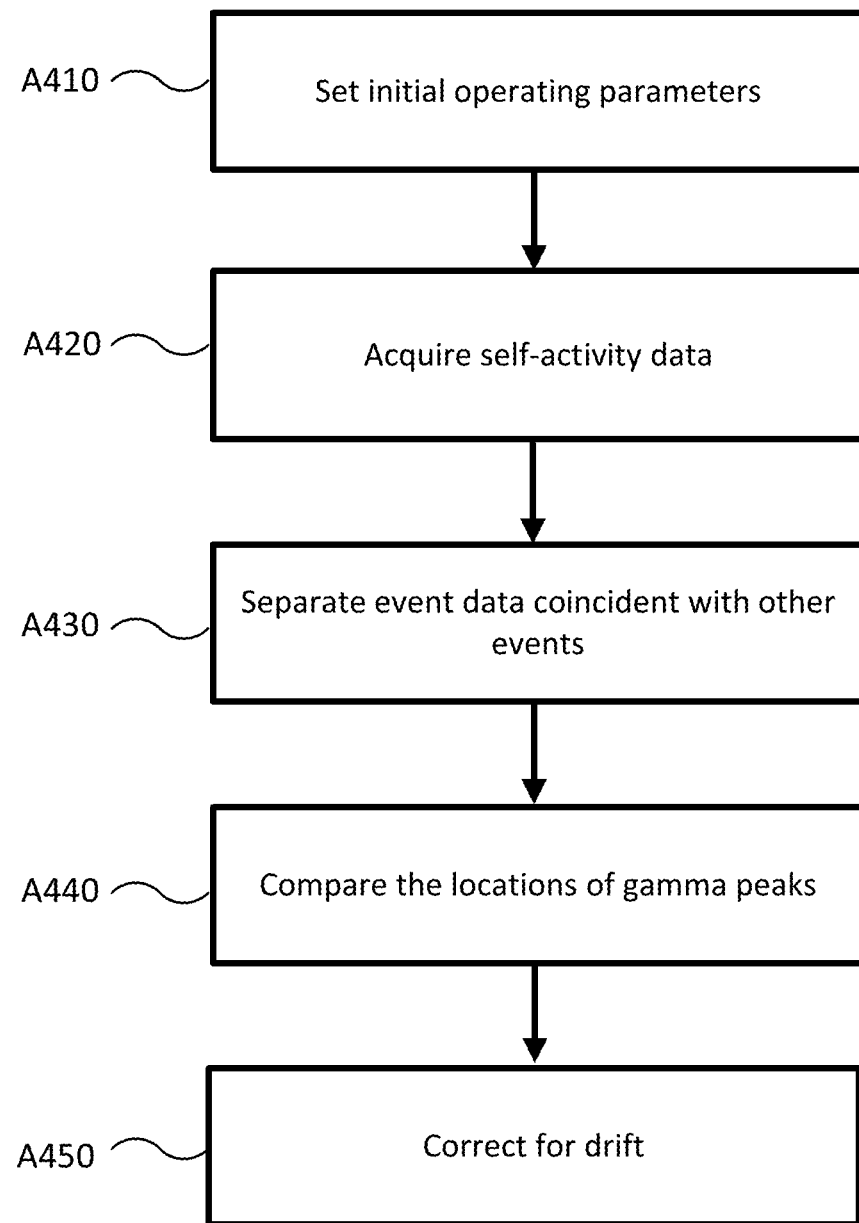
FIG. 13 depicts one embodiment of a flowchart for calculating stabilization.

FIG. 13 depicts a flowchart for calculating stabilization. During object scanning, self-activity events coincident between detector units are separated from singles data that contain object radioisotope distribution emission events. The processing unit 111 uses the self-activity gamma peak locations to adjust detector operating parameters to maintain signal level stability, for example, to correct for drift due to temperature variations.

As presented in the following sections, the acts may be performed using any combination of the components indicated in FIG. 1. The following acts may be performed by the processing unit 111, an imaging unit, a separate processor, or a combination thereof. Additional, different, or fewer acts may be provided. For example, during Act 420, all events are collected. If a scan is not taking place, the processing unit 111 may ignore single events. The acts are performed in the order shown or other orders. The acts may also be repeated continuously as the PET scanner is operated. Certain acts may be skipped.

At Act 410, the processing unit 111 sets the previously determined optimum $V_{op}$ and $V_{LE}$ for all detector units.

At Act 420, event data is acquired for all detector units that is due to both detector self-activity and a positron emitting source distribution within the PET scanner field of view.

At Act 430, the processing unit 111 identifies and separates events coincident with other events in adjacent detector units, which are due to the scintillator self-activity, from other singles events that are due to 511 keV positron annihilation radiation emitted from the scanner field of view. Singles events may be acquired and stored as scan data for later image processing use.

At Act 440, the processing unit 111 compares the location of gamma peaks of the self-activity events (202 keV and 307 keV) to the initial setup locations and previously stored self-activity events.

At Act 450, the processing unit 111 adjusts detector unit operating parameters to correct for any drift in the gamma peaks. Adjustment may be accomplished by changing operating bias voltages, using the amount of signal (energy) shift of the photopeaks, and SiPM design characteristics that determine the change in gain as a function of overvoltage.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for configuring a radiation detector including a plurality of detector units, each detector unit comprising a plurality of scintillator crystals, the method comprising:
   acquiring self-activity event data at multiple operating voltages, and at each operative voltage of the multiple operating voltages at multiple leading-edge threshold values including time-mark, energy, and location information for the self-activity event data;
   generating crystal region maps for the detector units and the plurality of scintillator crystals from the self-activity event data;
   identifying, in the self-activity event data, a first radiation event at a first scintillator crystal of a first detector unit of the radiation detector, the first radiation event being assigned a first time mark and a first position within the first detector unit using the crystal region maps, wherein the first radiation event is caused by a decay of a material in the first detector unit;
   identifying, in the self-activity event data, a second radiation event at a second scintillator crystal of a second detector unit of the radiation detector, the second radiation event related to and coincident to the first radiation event and being assigned a second time mark and a second position within the second detector unit using the crystal region maps, wherein the first and second detector units are adjacent within the radiation detector; and
   calculating operating parameters for the first detector unit based on the timing differences of the coincident events and a distance between the first position and second position of the coincident events.

2. The method of claim 1, wherein the first radiation event and second radiation event are caused by decay of Lu-176 in the first scintillator crystal.

3. The method of claim 1, wherein the first radiation event is related to a beta particle of the decay of the material and the second radiation event is related to a gamma particle of the decay of the material.

4. The method of claim 1, wherein detecting the first and second radiation events comprises detecting energy deposition information and position information for the first and second radiation events.

5. The method of claim 4, further comprising:
   determining a time-walk correction calibration factor for the first and second detector units based on the energy deposition information, position information and time marks of one or more coincident events.

6. The method of claim 4, further comprising:
   determining an energy calibration factor for the first and second detector units based on the energy deposition information, position information and time marks of one or more coincident events.

7. The method of claim 4, further comprising:
   determining a photo-sensor bias voltage for the first and second detector units based on the energy deposition information, position information and time marks of one or more coincident events.

8. The method of claim 4, further comprising:
   determining a discriminator trigger threshold for the first and second detector units based on the energy deposition information, position information and time marks of one or more coincident events.

9. A method comprising:
   selecting initial operating parameters for a plurality of detector units in a positron emission tomography detector, wherein the plurality of detector units each include a plurality of scintillator crystals that are multiplexed to generate a single arrival time measurement;
   generating crystal region maps for each of the plurality of detector units;
   acquiring self-activity data from the plurality of detector units at multiple operating voltages, and at each operative voltage of the multiple operating voltages at multiple leading-edge threshold values including time-mark, energy, and location information for the self-activity event data;
   identifying one or more coincident events in adjacent detector units from the self-activity data and the crystal region maps, wherein each coincident event of the one or more coincident events includes a first time mark and a first position within a first detector unit of the plurality of detector units and a second time mark and a second position within a second detector unit adjacent to the first detector unit; and
   calculating a timing offset for one or more of the plurality of scintillator crystals based on a time difference between the first time mark and the second time mark and a distance between the first position and the second position for each of the coincident events of the one or more coincident events.

10. The method of claim 9, further comprising:
    selecting new operating parameters based on the one or more coincident events for each of the plurality of detector units, wherein the new operating parameters generate less jitter in the plurality of detector units than the initial operating parameters.

11. The method of claim 9, further comprising:
    calculating average time differences between the plurality of detector units.

12. The method of claim 9, further comprising:
    calculating a photo sensor bias voltage and a discriminator trigger threshold for each of the plurality of detector units.

13. The method of claim 9, wherein the self-activity data is generated from intrinsic radiation of the composite detector.

* * * * *